United States Patent Office 3,646,131
Patented Feb. 29, 1972

3,646,131
PROCESS FOR THE CARBOXYLATION OF COMPOUNDS HAVING A REPLACEABLE HYDROGEN ATOM
Takeo Ikarasi, Niigata-shi, Japan, assignor to Japan Gas-Chemical Company, Inc., Tokyo, Japan
No Drawing. Filed Mar. 19, 1969, Ser. No. 808,644
Claims priority, application Japan, Mar. 21, 1968, 43/18,439; Mar. 22, 1968, 43/18,686; Mar. 23, 1968, 43/18,772
Int. Cl. C07c *51/00, 51/52*
U.S. Cl. 260—537 R      10 Claims

ABSTRACT OF THE DISCLOSURE

Carboxylation process comprising reacting a replaceable hydrogen-containing compound represented by the formula A—H wherein A is hydrogen or a COOM' or

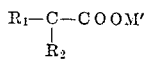

group in which M' is Na or K and $R_1$ and $R_2$ are alkyl, with a compound of the formula $M_2CO_3$ (M is Na or K) and CO at 250–400° C. under a pressure of 100–1000 kg./cm.² to convert the A—H compound to a compound of the formula A·COOM.

---

This invention relates to a new carboxylation process.

More specifically, the present invention provides a novel process for the carboxylation of compounds having a replaceable hydrogen atom which is characterized in that a replaceable hydrogen-containing compound of the formula A—H, wherein A is a monovalent group selected from the class consisting of hydrogen atom, COOM' group and

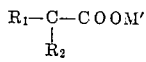

group, where M' is either Na or K and $R_1$ and $R_2$ are each hydrogen or alkyl group of 1 to 10 carbon atoms, is reacted with an alkali metal carbonate of the formula $M_2CO_3$, wherein M is either Na or K, and carbon monoxide, at a temperature of 250–400° C. and a pressure of 100–1000 kg./cm.² to convert the replaceable hydrogen-containing compound into A—COOM.

If the reaction is represented by an equation, it is as follows:

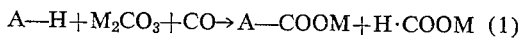

wherein A and M are as above defined.

The presence of moisture is undesirable in the present invention. Accordingly, it is necessary to remove the moisture from the starting materials used and from the inside of the apparatus as much as possible.

In practicing the present reaction either of the reaction components, the A—H compound or $M_2CO_3$, may be used in a greater proportion in terms of mole ratio. However, in the case where the A—H is an alkali metal salt of an aliphatic monocarboxylic acid, the A—H usually melts at elevated temperatures to function as a suitable reaction medium to the reaction mixture for carrying out the reaction smoothly. Therefore, in such case the A—H compound is used in an excessive amount to the $M_2CO_3$, preferably in an amount of 1 to 4 moles per the $M_2CO_3$. On the other hand, on certain occasions it is also possible to use the A—H in less than equimolar quantity of the $M_2CO_3$. However, in this case, the reaction is preferably carried out by the addition of a reaction medium such as alkali metal formate to the reaction system for smooth operation of the reaction. In case the A—H compound is hydrogen, it is preferred to add an alkali metal formate as the reaction medium to the reaction system. As to the amount of the carbon monoxide to be used, an amount equimolar or more than the limiting reactant of either the A—H or $M_2CO_3$ will do. The term "limiting reactant" is used herein to mean the reactant which is smaller in terms of mole between the two reactants.

In case the starting A—H represents an alkali metal salt of an aliphatic monocarboxylic acid, the reaction temperature of this reaction must be at least a temperature sufficient to maintain the A—H compound and/or the resulting alkali metal formate in a molten state. In case the A—H compound is hydrogen, the reaction temperature must be high enough to maintain the resulting alkali metal formate in a molten state. On the other hand, it must be below the decomposition temperatures of the A—H compound and the resulting A—COOM and H·COOM. While the upper and lower limits of the reaction temperature are determined as hereinabove described, generally speaking, a temperature less than 250° C. is not desirable since the reaction proceeds slowly at such low temperatures. A reaction temperature should be above 250° C.

Since the decomposition temperature of the starting material and the product salt is dependent upon the reaction pressure and the decomposition temperature becomes higher as the reaction pressure rises, the upper limit of the reaction temperature cannot be simply decided. It is generally critical that the temperature should not exceed 400° C. Consequently, the reaction temperature should be in the range 250–400° C., and a temperature in the range 280–370° C. is preferred. The use of an alkali metal formate as reaction medium is effective for lowering the reaction temperature.

Tht reaction proceeds to a certain extent even when the reaction pressure is less than 100 kg./cm.², but for obtaining the intended product in good yield the pressure should be at least 100 kg./cm.². Since the decomposition temperature rises correspondingly as the pressure becomes higher, it becomes possible at high pressure to raise the reaction temperature and hence the reaction speed. Thus, in general, the higher the pressure, the more satisfactory are the results obtained. However, in view of operation easiness and equipment cost, it is not advantageous to conduct the reaction at extremely high pressures. Thus, the reaction pressure should be below 1000 kg./cm.². Consequently, it is critical to carry out the reaction at a pressure in the range of from 100 to 1000 kg./cm.². A preferable range of the reaction pressure is from 300 to 1000 kg./cm.². The use of carbon monoxide in excess or the conjoint use of an inert gas such as nitrogen or argon is effective for maintaining the reaction pressure.

In a preferred embodiment, at least one of the starting A—H compound, the A—COOM or H·COOM compound formed during the course of the reaction and the compound added as reaction medium is molten at reaction temperatures, the alkali metal carbonate is suspended in the melt in the powdery state, and the reaction is performed while maintaining the reaction mixture in the fluid state with stirring. The reason why the reaction in the fluid state is preferred is that local overheating of the reaction mixture which creates scorching or decomposition of the reaction mixture can be avoided to afford such advantages as that not only the reaction can be made to proceed smoothly but also the transfer of the reaction mixture can be readily carried out. In some cases, for instance, when the A—H compound is hydrogen, the reaction system is not in the molten state at the initiation of the reaction, but in such cases the intended product A—COOM and/or the H·COOM, which are formed as the reaction advances, are molten at reaction temperatures, thus resulting in the formation of the above fluid state. However, even in such cases, it is possible to maintain the reaction ssytem in the fluid state from the initiation of the reaction by adding to the system a reaction medium such as an alkali metal formate prior to the initiation of the reaction. As the reaction vessel, either the shaking, rotating or agitating type of autoclave is conveniently used for maintaining the reaction mixture in a fluid state. Further, it is possible to carry out the reaction according to the continuous method.

The A—COOM, i.e., the intended reaction product, is recovered from the reaction mixture by a suitable method. Further, if necessary, the reaction product, can be obtained in the free acid form by adding an acid or blowing carbon dioxide, into an aqueous solution of the reaction product in the alkali metal salt form to convert it to an acid form and recovering it by a customary separating method such as extraction, distillation and crystallization.

The invention process, which is a new carboxylation process by which either the alkali metal salts of aliphatic dicarboxylic acids or formic acid can be obtained in good yield, is possible of various modification within the scope of the appended claims.

One of the most important embodiments of the present invention is the process wherein the alkali metal salts of oxalic acid are obtained as the intended reaction product, using either sodium or potassium formate as the hereinbefore described A—H compound of Equation 1.

A number of methods of producing oxalic acid have been known in the past, including (1) the alkali fusion method of cellulose, (2) the method of oxidizing the saccharide or starch with concentrated nitric acid, (3) the method of heating a formic alkali metal salt in the absence of air, and others. However, none of these conventional methods could be considered as being commercially advantageous methods, since all of them possessed some defects as regards such points as availability of the starting materials, yield and the treatment of the product.

The process for producing alkali metal oxalates according to the present invention is represented by the following Equation 2:

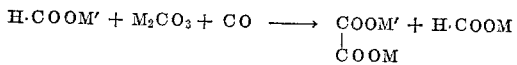

$$H \cdot COOM' + M_2CO_3 + CO \longrightarrow \underset{COOM}{COOM'} + H \cdot COOM \quad (2)$$

wherein M and M', which may be the same or different, are each either Na or K.

As indicated in the foregoing equation, the alkali metal formate and carbonate may be of a different class. For example, potassium formate and sodium-potassium oxalate are principally formed from sodium formate and potassium carbonate. However, since in this case the potassium formate formed again reacts with the potassium carbonate to form potassium oxalate, with the consequence that there is the drawback that a mixture of potassium oxalate and sodium-potassium oxalate is formed. It is thus preferred to use an alkali metal of the same class. The reaction of Equation 2 is carried out at a temperature of 250 to 400° C., preferably 320 to 370° C. The alkali metal oxalate is obtained by separating and removing the starting and resulting alkali metal formates and the unreacted alkali metal carbonate from the reaction mixture. Oxalic acid is obtained by adding an acid or blowing carbon dioxide, into an aqueous solution of the above alkali metal oxalate.

In the case where M and M' are the same alkali metal, the alkali metal formate, the starting material, by reacting with the alkali metal carbonate, as seen in the foregoing Equation 2, forms an equimolar quantity of an alkali metal oxalate as well as an equimolar quantity of an alkali metal formate as by-product. Consequently, the alkali metal formate is not consumed along with the reaction of Equation 2 at all. In other words, an alkali metal oxalate which is commercially valuable is synthesized, in essence, from alkali metal carbonate and carbon monoxide which are inexpensive. Hence, this process becomes very valuable as a commercial production method.

Next, as another mode of practicing the invention process, an alkali metal salt of an aliphatic saturated monocarboxylic acid having at least one replaceable hydrogen atom on its alpha carbon is used as the A—H compound of Equation 1 and the alkali metal salt of either malonic acid or its derivative is obtained as the intended reaction product. This process is represented by the following Equation 3:

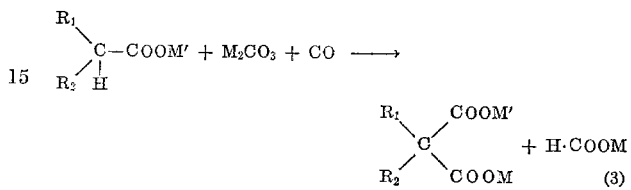

wherein $R_1$ and $R_2$ are each either hydrogen or an alkyl group having 1 to 10 carbon atoms and may be the same or different.

The method of producing potassium malonate by reacting potassium acetate with potassium carbonate and carbon dioxide under high pressure is known (German Pat. No. 1,185,602). This reaction is represented by the following equation:

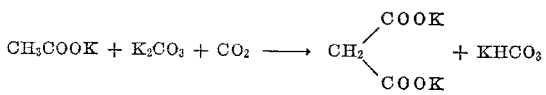

The process of the present invention is a new method which uses carbon monoxide instead of the carbon dioxide noted above. Carbon monoxide is available at a lower cost than carbon dioxide. Hence, the invention process which uses carbon monoxide as the starting material is very valuable as a commercial method of producing malonic acid.

A further surprising fact is that this reaction between alkali metal carbonate and carbon monoxide cannot only be applied to the alkali metal acetates but also to the alkali metal salts of the other aliphatic saturated monocarboxylic acids of 3 more carbon atoms having at least one replaceable hydrogen atom on its alpha carbon.

In both cases, the intended products can be obtained at considerably high reaction rates. As shown by the general formula, the carboxyl group is always introduced to the alpha carbon of the saturated monocarboxylic acid, with the consequence that an alkali salt of a derivative of malonic acid is formed.

In preparing these derivatives of malonic acid the method employed heretofore was that of reacting an alkyl iodide with a sodiomalonic diethyl ester. However, in accordance with the invention process these derivatives can be advantageously prepared directly from the saturated monocarboxylic acids.

In the reaction of Equation 3, the reaction temperature preferably used is 250–400° C., and still more preferably 280–350° C. Further, if in initiating the reaction a small quantity of the alkali metal formate is added in advance as the reaction medium, it becomes possible to reduce the reaction temperature. Again, the reaction temperature varies somewhat depending upon the class of the starting alkali metal salt of aliphatic monocarboxylic acid used, and as an increase takes place in the number of carbon atoms of the starting alkali metal carboxylate, the optimum temperature shifts somewhat to the high side. In the case of potassium acetate a temperature ranging from 280–330° C. is preferred. Further, as the alkali metal carbonate to be used in the reaction of Equation 3, the potassium salt is preferred over the sodium salt.

It has been previously noted that in the reaction of Equation 2 the alkali metal formates react with alkali metal carbonate and carbon monoxide to form the alkali metal oxalate in good yield. Now, in practicing the reaction of Equation 3 it is conceivable that the alkali metal formates which form as a by-product simultaneously with the formation of the alkali metal salts of malonic acid or its derivatives are converted to alkali metal oxalates. However, in the case where the two reactions take place concurrently, the temperature range optimum to the formation of alkali metal salts of malonic acid and its derivatives is in the zone lower than the temperature range optimum to the formation of alkali metal oxalates. Therefore, when the reaction is performed at a temperature optimum to the formation of the former, the formation of the alkali metal oxalate is substantially prevented and the alkali metal salt of malonic acid or its derivative can be selectively produced. If the reaction is carried out by employing a reaction temperature which is relatively high, e.g., say, above 320° C., it becomes possible to form the alkali metal salts of malonic acid or its derivatives and the alkali metal salts of oxalic acid at the same time.

An instance of the post-treatment of the reaction product is as follows:

At first, the crude product is dissolved in water and purified, for example, by filtration or treatment with active carbon. Then, the resulting salt and unreacted salts are converted to corresponding free acids by addition of an organic or inorganic acid or blowing of carbon dioxide under pressure. Thereafter, the intended product in the free acid form can be recovered by a customary method such as extraction.

Still another mode of practicing the invention process is that of forming the alkali metal formates using $H_2$ as the A—H compound of Equation 1. This process is represented by the following Equation 4:

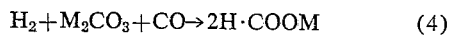

$$H_2 + M_2CO_3 + CO \rightarrow 2H \cdot COOM \quad (4)$$

In the conventional methods the alkali metal formates are formed as by-product in the manufacture of pentaerythritol or can be obtained by reacting carbon monoxide with a solid caustic alkali at an elevated temperature and high pressure. The process according to the present invention differs completely from these conventional methods. It is possible according to the invention process to produce the alkali metal formates at low cost.

The reaction of Equation 4 is carried out at a temperature of 250–400° C., preferably 300–350° C. The alkali metal formates formed are molten at these temperatures and hence function conveniently as reaction medium. The ratio of composition of the starting hydrogen and the carbon monoxide may be one in which either may predominate. A preferred ratio is that in which $CO/H_2$ is 4 or less, since there is a tendency to the setting up of a reaction in which the resulting alkali metal formates are converted to alkali metal oxalates as the proportion of carbon monoxide increases. The hydrogen and/or carbon monoxide may be used in equimolar quantities to the alkali metal carbonate, which is the limiting reactant, but they also may be used in excess. The use of these in excess is also effective for the maintenance of the reaction pressure. However, the inert gases such as nitrogen and argon may also be conjointly used for maintaining the reaction pressure.

As previously described in connection with the reaction of Equation 2, alkali metal oxalates are formed in good yield using alkali metal formates, alkali metal carbonates and carbon monoxide. Hence, in practicing this invention process, the reconversion of the resulting alkali metal formates into alkali metal oxalates is also conceivable. However, in case the reaction is conducted, in the presence of hydrogen, the temperature range optimum to the formation of alkali metal salts of formic acid is in the zone lower than the temperature range optimum to the formation of alkali metal oxalates. Therefore, when the reaction is performed at a temperature optimum to the formation of the former, the formation of the alkali metal oxalate is substantially prevented and the alkali metal salt of formic acid can be selectively produced. When it is desired to produce alkali metal oxalate and formate concurrently, it is preferred to carry out the reaction at a temperature above 380° C. and at a $CO/H_2$ ratio greater than 4.

In the reaction of Equation 4, use of potassium carbonate as the alkali metal carbonate is more desirable than sodium carbonate.

The post-treatment of the reaction product, obtained by the reaction of Equation 4, is carried out, for example, in the following manner. After dissolving the reaction mixture in water, the impurities are removed therefrom by filtration. Next, an acid such, for example, as hydrochloric or sulfuric acid is added to isolate the organic acid in the solution, after which formic acid is collected by distillation. On the other hand, when it is desired to separate the product as an alkali metal formate, the reaction mixture is treated with methanol. In this manner the alkali metal formate can be isolated with ease utilizing the difference in the solubility in methanol among the alkali metal formate, the unreacted carbonate and the oxalate formed as by-product.

EXAMPLE 1

A mixture of 8.4 grams (0.1 mol) of dried potassium formate and 6.9 grams (0.05 mol) of potassium carbonate, after having been thoroughly ground in a mortar and intimately mixed, was charged to a 100 ml. autoclave. The whole of the autoclave was again dried at 80° C. under a reduced pressure of 20 mm. Hg, after which carbon monoxide was introduced to a pressure of 200 kg./cm.² The autoclave was then heated for 3 hours at 350° C. The maximum pressure reached during this time was 470 kg./cm.² After completion of the reaction, the autoclave was cooled. The reaction product was then dissolved in water and the insoluble matter was separated by filtration. The insoluble matter amounted to 0.44 gram. On analysis of the filtrate, it was found that 6.51 grams (0.039 mol) of potassium oxalate, 0.88 gram (0.006 mol) of potassium carbonate, and 8.09 grams (0.96 mol) of potassium formate were present. The yield of potassium oxalate, based on the potassium carbonate, was 78.5%.

EXAMPLE 2

An autoclave was charged as in Example 1 with 6.8 grams (0.1 mol) of dried sodium formate and 5.3 grams (0.05 mol) of sodium carbonate, after which carbon monoxide was introduced to a pressure of 200 kg./cm.² The autoclave was heated at 360° C. for 3 hours, after which the reaction product was treated as in Example 1 to obtain 5.1 grams (0.038 mol) of sodium oxalate. The yield of sodium oxalate, based on the sodium carbonate, was 76.0%.

EXAMPLE 3

A mixture of 10.2 grams (0.15 mol) of dried sodium formate and 6.9 grams (0.05 mol) of potassium carbonate was charged to an autoclave as in Example 1, following which carbon monoxide was introduced to a pressure of 150 kg./cm.² After heating the autoclave at 360° C. for 3 hours, the reaction product was treated as in Example 1 to obtain 0.041 mol of sodium-potassium oxalate. The yield of sodium-potassium oxalate, based on the potassium carbonate, was 81.3%.

EXAMPLE 4

An autoclave was charged as in Example 1 with 4.2 grams (0.05 mol) of dried potassium formate and 6.9 grams (0.05 mol) of potassium carbonate, after which carbon monoxide was introduced to a pressure of 200 kg./cm.² After heating the autoclave at 340° C. for 3 hours, the reaction product was treated as in Exampple 1 to obtain 6.22 grams (0.038 mol) of potassium oxalate.

The yield of potassium oxalate, based on the potassium carbonate, was 75.0%.

EXAMPLE 5

A mixture of 3.4 grams (0.04 mol) of dried potassium formate and 6.9 grams (0.05 mol) of potassium carbonate was charged to an autoclave as in Example 1, following which carbon monoxide was introduced to a pressure of 200 kg./cm.$^2$ (maximum pressure of 460 kg./cm.$^2$). After heating the autoclave at 350° C. for 3 hours, the reaction product was treated as in Example 1 to obtain 0.037 mol of potassium oxalate. The yield of potassium oxalate, based on the potassium carbonate, was 75.0%.

Control

A mixture of 15.2 grams (0.181 mol) of dried potassium formate and 16.6 grams (0.120 mol) of potassium carbonate was thoroughly ground in a mortar and charged to a 100-ml. autoclave. After the drying was repeated in the same manner as in Example 1, the autoclave was cooled and 40.5 grams (0.921 mol) of liquified carbon dioxide were introduced to the autoclave instead of CO, followed by heating at 250° C. for 3 hours. The maximum pressure was 454 kg./cm.$^2$.

After the completion of the reaction, the reaction product was subjected to the post-treatment to obtain potassium oxalate in a yield of 3.44% based on the potassium carbonate.

EXAMPLE 6

A mixture consisting of 9.8 grams (0.1 mol) of potassium acetate and 6.9 grams (0.05 mol) of potassium carbonate was ground in a mortar and intimately mixed. The mixture was then dried and charged to a shaking type autoclave. The whole of the autoclave was again dried at 80° C. under a reduced pressure of 20 mm. Hg, after which carbon monoxide was introduced to 200 kg./cm.$^2$. The reaction was then carried out by heating the autoclave at 300° C. for 3 hours. The maximum pressure attained during the heating was 424 kg./cm.$^2$. This was followed by cooling the autoclave and release of its pressure. The resulting reaction product was dissolved in about a tenfold amount of water, after which the insoluble matter was separated by filtration. Potassium malomate was obtained in an amount of 6.49 grams (0.036 mol). The yield of potassium malonate, based on the potassium carbonate, was 72.0%. The potassium oxalate formed as by-product amounted to 0.69 gram (0.0042 mol).

EXAMPLE 7

A mixture consisting of 9.8 grams (0.1 mol) of potassium acetate, 6.9 grams (0.05 mol) of potassium carbonate and 0.8 gram (0.01 mol) of potassium formate was reacted by the same procedure as described in Example 6 by heating at 275° C. for 3 hours under an initial pressure of 200 kg./cm.$^2$ of carbon monoxide. After carrying out the post-treatment of the reaction product as in Example 6, 6.32 grams (0.035 mol) of potassium malonate was obtained, the yield of which, based on the potassium carbonate, was 70.2%. The potassium oxalate formed as by-product amounted to 0.60 gram (0.0036 mol).

EXAMPLE 8

A mixture consisting of 9.0 grams (0.08 mol) of potassium propionate and 5.5 grams (0.04 mol) of potassium carbonate was ground in a mortar and intimately mixed. The procedure described in Example 6 was followed and carbon monoxide was introduced at an initial pressure of 200 kg./cm.$^2$, the reaction then being carried out by heating at 320° C. for 3 hours. The maximum pressure reached during the reaction was 429 kg./cm.$^2$. The autoclave was then cooled and its pressure released, following which the reaction product was dissolved in about a tenfold amount of 20% aqueous hydrochloric acid solution and then the insoluble matter was separated by filtration. Propionic acid and formic acid were removed from the solution by extraction with n-hexane, followed by continuous extraction with ether. The ether was evaporated and 3.56 grams (0.03 mol) of crystals of organic acid were obtained. The melting point of this substance was 130–133° C., and it was confirmed by means of infrared analysis that this consisted of methyl malonic acid. The yield of methyl malonic acid, based on the potassium carbonate, was 75.0%. Potassium oxalate formed as by-product amounted to 0.64 gram (0.0038 mol).

EXAMPLE 9

A mixture consisting of 14.0 grams (0.1 mol) of potassium isovalerate and 6.9 grams (0.05 mol) of potassium carbonate was reacted as in Example 8 by heating at 350° C. for 3 hours under an initial pressure of 200 kg./cm.$^2$ of carbon monoxide. This was followed by a post-treatment of the reaction product as in Example 8 to obtain 5.53 grams (0.038 mol) of isopropyl malonic acid. The yield of isopropyl malonic acid, based on the potassium carbonate, was 75.6%. The potassium oxolate formed as by-product amounted to 1.2 grams (0.0072 mol).

EXAMPLE 10

A mixture consisting of 4.9 grams (0.05 mol) of potassium acetate and 6.9 grams (0.05 mol) of potassium carbonate was reacted as in Example 6 by heating at 300° C. for 3 hours under an initial pressure of 200 kg./cm.$^2$ of carbon monoxide to yield 6.1 grams (0.034 mol) of potassium malonate. The yield of potassium malonate, based on the potassium carbonate, was 68.0%. Potassium oxalate formed as by-product amounted to 0.6 gram (0.0036 mol).

EXAMPLE 11

An autoclave was charged with 7.8 grams (0.071 mol) of sodium propionate which was used instead of potassium propionate in Example 8 but the reaction was otherwise carried out exactly as described therein. The post-treatment of the resulting product was carried out as in Example 8 to obtain 3.30 grams (0.028 mol) of methyl malonic acid crystals. The yield of methyl malonic acid, based on the potassium carbonate, was 69.5%. The by-product potassium oxalate formed amounted to 0.61 gram (0.0037 mol).

EXAMPLE 12

A mixture consisting of 9.8 grams (0.1 mol) of potassium acetate, 5.3 grams (0.05 mol) of sodium carbonate and 0.8 gram (0.01 mol) of potassium formate was reacted as in Example 6 by heating at 330° C. for 5 hours under an initial pressure of 300 kg./cm.$^2$ of carbon monoxide to yield 0.8 gram (0.005 mole) of sodium-potassium malonate. The yield of sodium-potassium malonate, based on the sodium carbonate, was 10.1%. Trace of sodium oxalate was confirmed.

EXAMPLE 13

Dried potassium carbonate (13.8 grams; 0.10 mol), after having been thoroughly ground in a mortar, was charged to a shaking type 100-ml. autoclave in whose interior had been placed a stainless steel ball of 8-mm. diameter for enhancing the agitation effect. This was followed by introduction under pressure of 200 kg./cm.$^2$ of a gas mixutre of carbon monoxide and hydrogen of 1:1 volume ratio. The reaction was then carried out for 3 hours by heating the autoclave at 350° C. During this heating period the maximum pressure reached was 420 kg./cm.$^2$. The reaction product obtained after cooling the autoclave was dissolved in about 150 ml. of water, after which the so obtained solution was filtered to remove the insoluble matter (mainly carbon). A part of the so obtained aqueous solution of salt was taken and its pH was adjusted to 1 by adding 20% nitric acid. The presence of formic acid was determined by gas chromotography. The amount thereof calculated as potassium formate in whole reaction product was 13.28 grams (0.158 mol), which was a conversion of 79.0% based on the potassium carbonate charged.

A part of the aqueous solution of salt was again taken and adjusted to pH=1 by the addition of 20% nitric acid and the unreacted potassium carbonate was decomposed. Next, the potassium oxalate formed was converted to calcium oxalate and precipitated by adding calcium chloride. The amount obtained was 0.67 gram (0.004 mol) calculated as potassium oxalate in whole reaction product.

EXAMPLE 14

The reaction was carried out as in Example 13 by charging an autoclave with 13.8 grams (0.10 mol) of potassium carbonate and heating at 340–350° C. for 3 hours. The composition of the gas charged was in a ratio of the carbon monoxide to the hydrogen of 4:1, i.e. with an excess of carbon monoxide. The pressure with which the gas was introduced was 195 kg./cm.² are the maximum pressure attained during the heating period was 438 kg./cm.². The so obtained reaction product was submitted to the same post-treatment as in Example 13 with the result that the presence of 12.60 grams (0.150 mol) of potassium formate and 2.74 grams (0.0164 mol) of potassium oxalate was confirmed. The conversion to potassium formate, based on the potassium carbonate, was 74.9% in this case.

EXAMPLE 15

Potassium carbonate (13.8 grams; 0.10 mol) was dried, after which is was reacted as in Example 13 for 3 hours in an atmosphere of a gas mixture consisting of carbon monoxide and hydrogen (1:1 volume ratio) under the conditions of a reaction temperature of 350° C. and an initial pressure of 100 kg./cm.² (maximum pressure of 196 kg./cm.²). As a result, 4.99 grams (0.0592 mol) of potassium formate was formed. This corresponds to a conversion of 29.6% based on the potassium carbonate charged. The formation of oxalate was not observed.

EXAMPLE 16

As in Example 13, 10.6 grams (0.10 mol) of sodium carbonate was reacted at 350° C. for 4 hours, using a 1:1 gas mixture of carbon monoxide and hydrogen, and under the conditions of an initial pressure of 200 kg./cm.² (maximum pressure of 445 kg./cm.²). This was followed by carrying out the post-treatment as in Example 13. As a result, 2.1 grams (0.0308 mol) of sodium formate and a trace of sodium oxalate were confirmed. The conversion to sodium formate was 15.4%.

EXAMPLE 17

As in Example 13, 13.8 grams (0.10 mol) of potassium carbonate and a gas mixture consisting of carbon monoxide and hydrogen in a ratio of 4:1 was reacted at 370–380° C. for 3 hours, the gas mixture being initially introduced at a pressure of 195 kg./cm.² (maximum pressure 462 kg./cm.²). As a result, 11.8 grams (0.140 mol) of potassium formate and 4.03 grams (0.0242 mol) of potassium oxalate were obtained. The conversion to potassium formate, based on the potassium carbonate, was 70.0%.

EXAMPLE 18

Potassium carbonate (13.8 grams; 0.10 mol) with 1.6 grams (0.02 mol) of potassium formate, was dried, after which it was reacted as in Example 13 for 2.5 hours in an atmosphere of a gas mixture consisting of carbon monoxide and hydrogen (1:1 volume ratio) under the conditions of a reaction temperature of 320° C. and an initial pressure of 200 kg./cm.². As a result, 13.28 grams (0.158 mol) of potassium formate was formed. This corresponds to a conversion of 79.0% based on the potassium carbonate charged. Trace of oxalate was observed.

I claim:
1. A process of the carboxylation of compounds having a replaceable hydrogen atom which comprises reacting a replaceable hydrogen-containing compound of the formula

A—H wherein A is a monovalent group selected from the group consisting of COOM' group and

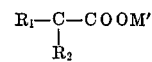

group, where M' is of an alkali metal selected from Na and K, and $R_1$ and $R_2$ are each a monovalent group selected from hydrogen and alkyl groups of 1–10 carbon atoms; with an alkali metal carbonate of the formula $M_2CO_3$ wherein M is an alkali metal selected from Na and K; and carbon monoxide at a temperature of 250–400° C. and a pressure of 100–1000 kg./cm.² to convert said replaceable hydrogen-containing compound to A—COOM.

2. The process of claim 1 wherein said reaction temperature is 280–370° C., and said pressure is 300–1000 kg./cm.².

3. The process of claim 1 wherein said A—H is an alkali metal formate.

4. The process of claim 3 wherein said alkali metal formate and said alkali metal carbonate are salts of the same alkali metal.

5. The process of claim 3 wherein the reaction temperature is 320–370° C.

6. The process of claim 1 wherein said A-H is $CH_3COOK$ and said alkali metal carbonate is $K_2CO_3$.

7. The process of claim 6 wherein the reaction temperature is 280–330° C.

8. The process of claim 10 wherein the mole ratio of said CO to said $H_2$ contained in the starting materials, expressed as $CO/H_2$, is not greater than 4.

9. The process of claim 8 wherein the reaction temperature is 300–350° C.

10. A process for the carboxylation of hydrogen which consists essentially of reacting, under substantially anhydrous conditions, $H_2$ with an alkali metal carbonate of the formula $M_2CO_3$ wherein M is an alkali metal selected from Na and K, and carbon monoxide at a temperature of 250–400° C. and a pressure of 100–1000 kg./cm.² to convert said hydrogen to H—COOM.

References Cited
UNITED STATES PATENTS 1,995,211    3/1935    Leroux _____ 260—542

LORRAINE A. WEINBERGER, Primary Examiner

V. GARNER, Assistant Examiner

U.S. Cl. X.R.

260—538, 542